US009534483B2

(12) United States Patent
Khaledi et al.

(10) Patent No.: US 9,534,483 B2
(45) Date of Patent: Jan. 3, 2017

(54) RECOVERY FROM A HYDROCARBON RESERVOIR

(71) Applicants: Rahman Khaledi, Calgary (CA); Thomas J. Boone, Calgary (CA)

(72) Inventors: Rahman Khaledi, Calgary (CA); Thomas J. Boone, Calgary (CA)

(73) Assignee: ExxonMobil Upstream Research Company, Spring, TX (US)

( * ) Notice: Subject to any disclaimer, the term of this patent is extended or adjusted under 35 U.S.C. 154(b) by 55 days.

(21) Appl. No.: 14/316,134

(22) Filed: Jun. 26, 2014

(65) Prior Publication Data

US 2015/0068750 A1   Mar. 12, 2015

(30) Foreign Application Priority Data

Sep. 9, 2013 (CA) ..................................... 2826494

(51) Int. Cl.
*E21B 43/24* (2006.01)
*E21B 43/16* (2006.01)
*C09K 8/592* (2006.01)

(52) U.S. Cl.
CPC ........... *E21B 43/2408* (2013.01); *C09K 8/592* (2013.01); *E21B 43/166* (2013.01); *E21B 43/2406* (2013.01)

(58) Field of Classification Search
CPC ...... E21B 43/24; E21B 43/2408; E21B 43/16; E21B 43/2406
See application file for complete search history.

(56) References Cited

U.S. PATENT DOCUMENTS

| 3,292,702 | A | 12/1966 | Boberg | 166/40 |
| 3,739,852 | A | 6/1973 | Woods et al. | 166/303 |
| 4,280,559 | A | 7/1981 | Best | 166/303 |
| 4,344,485 | A | 8/1982 | Butler | 166/271 |
| 4,519,454 | A | 5/1985 | McMillen | 166/303 |
| 4,697,642 | A | 10/1987 | Vogel | 166/263 |
| 5,607,016 | A | 3/1997 | Butler | 166/263 |
| 5,899,274 | A | 5/1999 | Frauenfeld et al. | 166/401 |
| 6,230,814 | B1 | 5/2001 | Nasr et al. | 166/400 |
| 6,591,908 | B2 | 7/2003 | Nasr | 166/272.3 |
| 6,662,872 | B2 * | 12/2003 | Gutek | E21B 43/168 166/263 |

(Continued)

FOREIGN PATENT DOCUMENTS

| CA | 1304287 | 6/1992 | ............ E21B 43/24 |
| CA | 2785871 | 8/2001 | ........... E21B 43/241 |

(Continued)

OTHER PUBLICATIONS

Liu, Z et al. (2012) "Reservoir Simulation Modeling of the Mature Cold Lake Steaming Operations," *Soc. of Petroleum Eng.*, SPE 160491.

*Primary Examiner* — Zakiya W Bates
(74) *Attorney, Agent, or Firm* — ExxonMobil Upstream Research Company

(57) ABSTRACT

Methods and apparatus for recovering heavy oil from subterranean reservoirs. A steam-utilizing heavy oil recovery process may be used to recover the heavy oil while employing a steam-solvent mixture. The solvent may be a tailored hydrocarbon solvent obtained from a precursor mixture of hydrocarbon compounds from which light end hydrocarbon compounds have been removed.

13 Claims, 11 Drawing Sheets

(56) References Cited

U.S. PATENT DOCUMENTS

| | | |
|---|---|---|
| 6,883,607 B2 | 4/2005 | Nenniger et al. .......... 166/272.4 |
| 7,363,973 B2 | 4/2008 | Nenniger et al. .......... 166/272.4 |
| 7,527,096 B2 | 5/2009 | Chung et al. ................. 166/268 |
| 7,556,099 B2 | 7/2009 | Arthur et al. ............... 166/272.3 |
| 7,717,175 B2 | 5/2010 | Chung et al. ................. 166/268 |
| 2007/0168170 A1 | 7/2007 | Thomas .......................... 703/10 |
| 2010/0276140 A1 | 11/2010 | Edmunds et al. .......... 166/272.3 |
| 2012/0048382 A1 | 3/2012 | James ............................... 137/1 |
| 2012/0059640 A1 | 3/2012 | Roy et al. ........................ 703/10 |
| 2012/0325470 A1 | 12/2012 | Gupta et al. ............... 166/272.3 |
| 2013/0045902 A1 | 2/2013 | Thompson et al. .......... 507/261 |
| 2013/0146285 A1 | 6/2013 | Chhina et al. ................. 166/268 |

FOREIGN PATENT DOCUMENTS

| | | | |
|---|---|---|---|
| CA | 2250648 | 9/2002 | ............ E21B 43/24 |
| CA | 2323029 | 3/2004 | ............ E21B 43/24 |
| CA | 2342955 | 6/2005 | ............ E21B 43/24 |
| CA | 2147079 | 10/2006 | ............ E21B 43/16 |
| CA | 2299790 | 7/2008 | ............ E21B 43/24 |
| CA | 2698898 | 7/2011 | ............ E21B 43/22 |
| CA | 2655852 | 4/2012 | .............. C10G 1/00 |
| CA | 2769356 | 8/2012 | ............ E21B 43/22 |
| CA | 2740941 | 11/2012 | ............ E21B 43/16 |
| CA | 2778135 | 11/2012 | .......... E21B 43/241 |

\* cited by examiner

RECOVERY FROM A HYDROCARBON RESERVOIR

CROSS REFERENCE TO RELATED APPLICATIONS

This application claims the priority benefit of Canadian Patent Application number 2,826,494 filed Sep. 9, 2013 entitled IMPROVING RECOVERY FROM A HYDROCARBON RESERVOIR, the entirety of which is incorporated by reference herein.

FIELD

The present disclosure relates to harvesting hydrocarbon resources from underground formations using steam assisted processes.

BACKGROUND

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as including admissions of prior art.

Modern society is greatly dependent on the use of hydrocarbons for fuels and chemical feedstocks. Hydrocarbons are generally found in subsurface rock, soil or sand formations that can be termed "reservoirs." Removing hydrocarbons from such reservoirs depends on numerous physical properties of the formations, such as the permeability of the formations containing the hydrocarbons, the ability of the hydrocarbons to flow through the formations, and the proportion of hydrocarbons present, among other things.

Easily harvested sources of hydrocarbons are dwindling, leaving less accessible sources to satisfy future energy needs. However, as the costs of hydrocarbons increase, these less accessible sources become more economically attractive. For example, the harvesting of oil sands to remove hydrocarbons has become more extensive as it has become more economical. The hydrocarbons harvested from these reservoirs may have relatively high viscosities, for example, ranging from 1000 centipoise to 20 million centipoise with API (American Petroleum Institute) densities ranging from 8 API, or lower, up to 20 API, or higher. Accordingly, the hydrocarbons may include heavy oils, bitumen, or other carbonaceous materials, collectively referred to herein as "heavy oil," which are difficult to recover using standard techniques.

Several methods have been developed to remove hydrocarbons from oil sands. For example, strip or surface mining may be performed to access the oil sands, which can then be treated with hot water or steam to extract the oil. However, deeper formations may not be accessible using a strip mining approach. For these formations, a well can be drilled into the reservoir and steam, hot air, solvents, or combinations thereof, can be injected to release the hydrocarbons. The released hydrocarbons may then be collected by the injection well or by other wells (i.e. production wells) and brought to the surface.

A number of techniques have been developed for harvesting heavy oil from subsurface reservoirs using well-based recovery techniques. These operations include a suite of steam based in-situ thermal recovery techniques, such as cyclic steam stimulation (CSS), steam flooding and steam assisted gravity drainage (SAGD) as well as surface mining and their associated thermal based surface extraction techniques.

For example, CSS techniques includes a number of enhanced recovery methods for harvesting heavy oil from formations that use steam heat to lower the viscosity of the heavy oil. These steam assisted hydrocarbon recovery methods are described in U.S. Pat. No. 3,292,702 to Boberg, and U.S. Pat. No. 3,739,852 to Woods, et al., among others. CSS and other steam flood techniques have been utilized worldwide, beginning in about 1956 with the utilization of CSS in the Mene Grande field in Venezuela and steam flooding in the early 1960s in the Kem River field in California.

The CSS process may raise the steam injection pressure above the formation fracturing pressure to create fractures within the formation and enhance the surface area access of the steam to the heavy oil, although CSS may also be practiced at pressures that do not fracture the formation. The steam raises the temperature of the heavy oil during a heat soak phase, lowering the viscosity of the heavy oil. The injection well may then be used to produce heavy oil from the formation. The cycle is often repeated until the cost of injecting steam becomes uneconomical, for instance if the cost is higher than the money made from producing the heavy oil. Successive steam injection cycles re-enter earlier created fractures and, thus, the process becomes less efficient over time. CSS is generally practiced in vertical wells, but systems are operational in horizontal wells.

Solvents may be used in combination with steam in CSS processes, such as in mixtures with the steam or in alternate injections between steam injections. These techniques are described in Canadian Patent No. 2,342,955 to Leaute, U.S. Pat. No. 4,280,559 to Best, U.S. Pat. No. 4,519,454 to McMillen, and U.S. Pat. No. 4,697,642 to Vogel, among others.

Steam flooding is a process in which steam is injected from a series of vertical well injectors or horizontal well injectors and heavy oil is heated and pushed towards a series of vertical producer wells or horizontal producer wells. This process can be used as a late life process after a CSS operation. The process in late life is essentially a gravity drainage process. Solvent can be injected with steam to enhance the process. Further details may be obtained, for example, from Zhihong Liu and Shane D. Stark, "Reservoir Stimulation Modelling of the Mature Cold Lake Steaming Operations", Society of Petroleum Engineers, SPE 160491, presented in Calgary, Alberta, 12-14 Jun. 2012 (the disclosure of which is incorporated herein by reference).

Various embodiments of the SAGD process are described in Canadian Patent No. 1,304,287 to Butler and its corresponding U.S. Pat. No. 4,344,485. In SAGD, two horizontal wells are completed into the reservoir. The two wells are first drilled vertically to different depths within the reservoir. Thereafter, using directional drilling technology, the two wells are extended in the horizontal direction that result in two horizontal wells, vertically spaced from, but otherwise vertically aligned with the other. Ideally, the production well is located above the base of the reservoir but as close as practical to the bottom of the reservoir, and the injection well is located vertically 10 to 30 feet (3 to 10 meters) above the horizontal well used for production.

The upper horizontal well is utilized as an injection well and is supplied with steam from the surface. The steam rises from the injection well, permeating the reservoir to form a vapor chamber that grows over time towards the top of the reservoir, thereby increasing the temperature within the reservoir. The steam, and its condensate, raise the temperature of the reservoir and consequently reduce the viscosity of the heavy oil in the reservoir. The heavy oil and condensed steam will then drain downward through the reservoir under the action of gravity and may flow into the lower production well, whereby these liquids can be pumped to the surface. At the surface of the well, the condensed steam and heavy oil are separated, and the heavy oil may be diluted with appropriate light hydrocarbons for transport by pipeline.

A number of variations of the SAGD process have been developed in an attempt to increase the productivity of the process. For example, U.S. Pat. No. 6,230,814 to Nasr, et al., teaches how the SAGD process can be further enhanced through the addition of small amounts of solvent to the injected steam. Nasr teaches that as the planned SAGD operating pressure declines, the molecular weight of the solvent must be reduced in order to ensure that it is completely vaporized at the planned operating conditions. This approach results in the progressive exclusion of heavier solvents as lower operating pressures (and temperatures) are considered.

Solvents may also be used in concert with steam addition to increase the efficiency of the steam in removing the heavy oils. U.S. Pat. No. 6,230,814 to Nasr, et al., discloses a method for enhancing heavy oil mobility using a steam additive. The method included injecting steam and an additive into the formation. The additive includes a non-aqueous fluid, selected so that the evaporation temperature of the non-aqueous fluid is within about ±150° C. of the steam temperature at the operating pressure. Suitable additives include C1 to C25 hydrocarbons. At least a portion of the additive condenses in the formation. The mobility of the heavy oil obtained with the steam and solvent combination is greater than that obtained using steam alone under substantially similar formation conditions.

Canadian Patent No. 2,323,029 to Nasr and Isaacs discloses a method of producing hydrocarbons involving the injection of steam and an additive. The additive is a non-aqueous fluid having an evaporation temperature within about ±150° C. of the temperature of the steam at the operating pressure of the formation. The additive may be selected from C1 to C25 hydrocarbons.

Canadian Patent No. 2,769,356 to Gupta, Gittins and Bilozir discloses the use of a solvent of a pentane or hexane, or both, as an additive to, or sole component of, a gravity-dominated process for recovering heavy oil from a reservoir. However, the patent teaches that fractions heavier than hexane (such as C7, C8, C9, etc.) are not effective in enhancing the oil recovery process as they precipitate out in the near well vicinity and do not travel to the vapor-liquid interface within the reservoir.

To conserve energy, it has also been suggested to use lower pressure steam for heavy oil production. However, at lower operating pressures, the solubility of the solvents in the heavy oil is reduced, thereby resulting in lower production performance.

SUMMARY

A method of recovering heavy oil from a subterranean reservoir may comprise carrying out a steam-utilizing heavy oil recovery process to recover heavy oil from the subterranean reservoir while employing a steam/solvent mixture for said steam-utilizing heavy oil recovery process instead of steam alone, wherein the solvent used in said steam/solvent mixture is a tailored solvent obtained from a precursor mixture of hydrocarbon compounds by removing light end hydrocarbon compounds from said precursor mixture A method of recovering heavy oil from a subterranean reservoir by a solvent assisted, steam assisted gravity drainage process may comprise a) establishing fluid communication in a heavy oil-bearing formation between an injection well and a production well; b) vaporizing water and a tailored hydrocarbon solvent to produce a vaporized mixture; c) injecting said vaporized mixture into the subterranean reservoir via an injection well to permit the vaporized mixture to condense within the subterranean reservoir and to release latent heat of condensation to the subterranean reservoir; and d) extracting heavy oil from said production well. Said tailored hydrocarbon solvent is a mixture of hydrocarbon compounds obtained from a precursor mixture of hydrocarbon compounds by removing light end hydrocarbon compounds from said precursor mixture.

A method of producing a tailored solvent useful for a steam-utilizing heavy oil recovery process for extracting heavy oils from subterranean reservoirs may comprise separating a gas from a production well used for recovery of heavy oils from a subterranean reservoir by a steam utilizing heavy oil recovery process employing a hydrocarbon solvent; further separating said gas into fractions comprising water, light gas containing light end hydrocarbon compounds, and a mixture comprising hydrocarbon compounds from which said light end hydrocarbon compounds have been removed; and collecting said mixture of hydrocarbon compounds from which light end hydrocarbon compounds have been removed as a tailored hydrocarbon solvent useful for said steam-utilizing heavy oil recovery process for extracting heavy oils from a subterranean reservoir.

An apparatus for producing a tailored solvent useful for a steam-utilizing heavy oil recovery process for extracting heavy oils from a subterranean reservoirs may comprise a gas separator operationally connected to a production well used for a recovery of production fluid from said reservoir and adapted to separate a gas from said production fluid into fractions comprising water, light gas containing light end hydrocarbon compounds, and a mixture of hydrocarbons other than said light end hydrocarbon compounds; and a conduit operationally attached to said gas separator for removing from said gas separator said a mixture of hydrocarbons other than said light end hydrocarbon compounds and delivering said mixture of hydrocarbons other than said light end hydrocarbon compounds for use in a steam-utilizing heavy oil recovery process for extracting heavy oils from a subterranean reservoirs.

A tailored hydrocarbon solvent suitable for use for recovering heavy oil from a subterranean reservoir by a steam-utilizing heavy oil recovery process may be a tailored hydrocarbon solvent having been produced from a precursor mixture of hydrocarbon compounds by removing light end hydrocarbon compounds from the precursor mixture.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
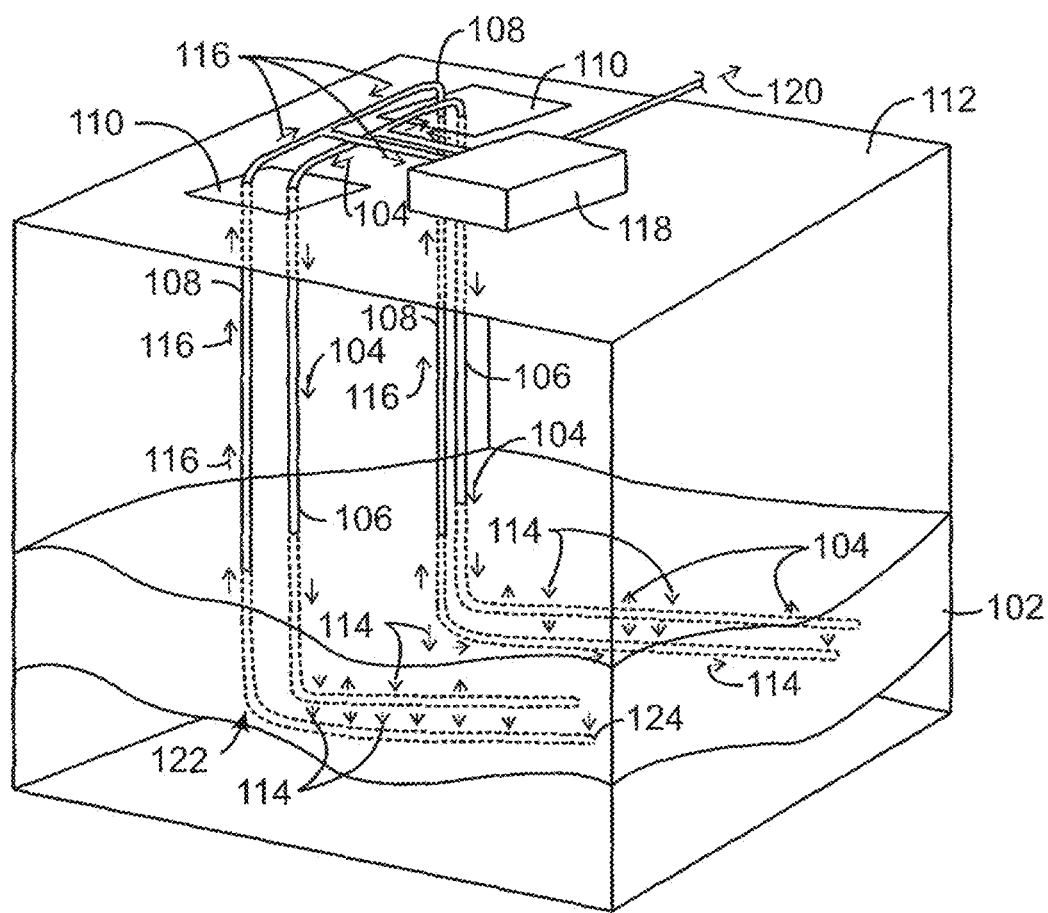
FIG. 1 is a drawing of a steam assisted gravity drainage (SAGD) process used for accessing hydrocarbon resources in a reservoir.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the term "base" indicates a lower boundary of the resources in a reservoir that are practically recoverable, by a gravity-assisted drainage technique, for example, using an injected mobilizing fluid, such as steam, solvents, hot water, gas, and the like. The base may be considered a lower boundary of the payzone. The lower boundary may be an impermeable rock layer, including, for example, granite, limestone, sandstone, shale, and the like.

The lower boundary may also include layers that, while not completely impermeable, impede the formation of fluid communication between a well on one side and a well on the other side. Such layers, which may include inclined heterolithic strata (IHS) of broken shale, mud, silt, and the like. The resources within the reservoir may extend below the base, but the resources below the base may not be recoverable with gravity assisted techniques.

"Bitumen" is a naturally occurring heavy oil material. Generally, it is the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of: 19 wt. % aliphatics (which can range from 5 wt. %-30 wt. %, or higher); 19 wt. % asphaltenes (which can range from 5 wt. %-30 wt. %, or higher); 30 wt. % aromatics (which can range from 15 wt. %-50 wt. %, or higher); 32 wt. % resins (which can range from 15 wt. %-50 wt. %, or higher); and some amount of sulfur (which can range in excess of 7 wt. %). In addition bitumen can contain some water and nitrogen compounds ranging from less than 0.4 wt. % to in excess of 0.7 wt. %. The metals content, while small, must be removed to avoid contamination of the product synthetic crude oil (SCO). Nickel can vary from less than 75 ppm (part per million) to more than 200 ppm. Vanadium can range from less than 200 ppm to more than 500 ppm. The percentage of the hydrocarbon types found in bitumen can vary. As used herein, the term "heavy oil" includes bitumen, as well as lighter materials that may be found in a sand or carbonate reservoir. Heavy oil may have a viscosity of about 1000 cP or more, 10,000 cP or more, 100,000 cP or more or 1,000,000 cP or more.

As used herein, a pressure "cycle" represents a sequential increase to peak operating pressure in a reservoir, followed by a release of the pressure to a minimum operating pressure. The elapsed time between two periods of peak operating pressure does not have to be the same between cycles, nor do the peak operating pressures and minimum operating pressures.

As used herein, two locations in a reservoir are in "fluid communication" when a path for fluid flow exists between the locations. For example, fluid communication between a production well and an overlying steam chamber can allow mobilized material to flow down to the production well for collection and production. As used herein, a fluid includes a gas or a liquid and may include, for example, a produced hydrocarbon, an injected mobilizing fluid, or water, among other materials.

"Facility" as used in this description is a tangible piece of physical equipment through which hydrocarbon fluids are either produced from a reservoir or injected into a reservoir, or equipment which can be used to control production or injection operations. In its broadest sense, the term facility is applied to any equipment that may be present along the flow path between a reservoir and its delivery outlets. Facilities may comprise production wells, injection wells, well tubulars, wellhead equipment, gathering lines, manifolds, pumps, compressors, separators, surface flow lines, steam generation plants, processing plants, and delivery outlets. In some instances, the term "surface facility" is used to distinguish those facilities other than wells.

"Heavy oil" includes oils which are classified by the American Petroleum Institute (API), as heavy oils, extra heavy oils, or bitumens. Thus the term "heavy oil" includes bitumen and should be regarded as such throughout this description. In general, a heavy oil has an API gravity between 22.30° (density of 920 kg/m$^3$ or 0.920 g/cm$^3$) and 10.00° (density of 1,000 kg/m3 or 1 g/cm). An extra heavy oil, in general, has an API gravity of less than 10.00° (density greater than 1,000 kg/m$^3$ or greater than 1 g/cm). For example, a source of heavy oil includes oil sand or bituminous sand, which is a combination of clay, sand, water, and bitumen. The thermal recovery of heavy oils is based on the viscosity decrease of fluids with increasing temperature or solvent concentration. Once the viscosity is reduced, the mobilization of fluids by steam, hot water flooding, or gravity is possible. The reduced viscosity makes the drainage quicker and therefore directly contributes to the recovery rate.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in heavy oil or in oil sands. However, the techniques described herein are not limited to heavy oils, but may also be used with any number of other reservoirs to improve gravity drainage of liquids. Hydrocarbon compounds may be aliphatic or aromatic, and may be straight chained, branched, or partially or fully cyclic.

"Permeability" is the capacity of a rock or other structure to transmit fluids through the interconnected pore spaces of the structure. The customary unit of measurement for permeability is the millidarcy.

"Pressure" is the force exerted per unit area by the gas on the walls of the volume. Pressure may be shown in this disclosure as pounds per square inch (psi), kilopascals (kPa) or megapascals (MPa). Unless otherwise specified, the pressures disclosed herein are absolute pressures, i.e. the sum of gauge pressure plus atmospheric pressure (generally 14.7 psi at standard conditions).

As used herein, a "reservoir" is a subsurface rock, sand or soil formation from which a production fluid, or resource, can be harvested. The formation may include sand, granite, silica, carbonates, clays, and organic matter, such as bitumen, heavy oil, oil, gas, or coal, among others. Reservoirs can vary in thickness from less than one foot (0.3048 m) to hundreds of feet (hundreds of m). The resource is generally a hydrocarbon, such as a heavy oil impregnated into a sand bed.

As discussed herein, "Steam Assisted Gravity Drainage" (SAGD), is a thermal recovery process in which steam, or combinations of steam and solvents, is injected into a first well to lower a viscosity of a heavy oil, and fluids are recovered from a second well. Both wells are generally horizontal in the formation and the first well lies above the second well. Accordingly, the reduced viscosity heavy oil flows down to the second well under the force of gravity, although pressure differential may provide some driving force in various applications. Although SAGD is used as an exemplary process herein, it can be understood that the techniques described can include any gravity driven process, such as those based on steam, solvents, or any combinations thereof.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. When a compound is indicated as "removed" or "substantially removed" from a mixture of compounds, it should be understood that there may remain such an amount of the compound in the mixture that cannot be removed by the technique employed for removal. For example, fractionation may leave small amounts or traces of a compound intended to be removed.

As used herein, "steam-utilizing heavy oil recovery processes" include any type of hydrocarbon recovery process that uses a heat source to enhance the recovery, for example, by lowering the viscosity of a hydrocarbon. These processes may use injected mobilizing steam, either wet steam or dry steam, in admixture with solvents, to lower the viscosity of the hydrocarbon. Such processes may include subsurface processes, such as cyclic steam stimulation (CSS), cyclic solvent stimulation, steam flooding, solvent injection, and SAGD, among others.

A "wellbore" is a hole in the subsurface made by drilling or inserting a conduit into the subsurface. A wellbore may have a substantially circular cross section or any other cross-sectional shape, such as an oval, a square, a rectangle, a triangle, or other regular or irregular shapes. As used herein, the term "well," when referring to an opening in the formation, may be used interchangeably with the term "wellbore." Further, multiple pipes may be inserted into a single wellbore, for example, as a liner configured to allow flow from an outer chamber to an inner chamber.

The term "hydrocarbon solvent" or "hydrocarbon mixture" as used herein means a mixture of at least two, and more usually, at least three, hydrocarbon compounds having a number of carbon atoms from the range of C1 to C30+. There are often at least hydrocarbons in the range of C3 to C12 or higher. The "light end compounds" are those hydrocarbons of such a mixture having the lowest number of carbon atoms, generally C1 to C3, but possibly higher depending on the context. These light end compounds have the lowest molecular weights and are generally the most volatile of the hydrocarbon compounds of the mixture.

The term "tailored solvent" means a solvent that has been produced from a mixture of hydrocarbons by removal of light end compounds from said mixture. The composition of the tailored solvent has been chosen by the removal of the light end compounds to optimize a steam-utilizing heavy oil recovery process when injected into a heavy oil bearing reservoir together with the steam.

Solvent assisted-steam assisted gravity drainage (SA-SAGD) is described as an example of a steam-utilizing extraction process for recovery of heavy oils from a subterranean formation. It will be appreciated, however, that other steam-utilizing processes may be used, e.g. CSS and steam flooding, in which a tailored solvent as disclosed herein is employed with steam used in the process.

For a better understanding of the techniques, a brief explanation steam assisted gravity drainage and solvent assisted-steam assisted gravity drainage is first provided below, although it will be appreciated that the disclosed techniques may be employed with other steam-utilizing heavy oil recovery processes, e.g. cyclic steam stimulation (CSS) and steam flooding)

Steam Assisted Gravity Drainage (SAGD) and Solvent Assisted SAGD (SA-SAGD)

FIG. 1 is a drawing of a steam assisted gravity drainage (SAGD) process 100 used for accessing hydrocarbon resources in a reservoir 102. In the SAGD process 100, steam 104 can be injected through injection wells 106 to the reservoir 102. As previously noted, the injection wells 106 may be horizontally drilled through the reservoir 102. Production wells 108 may be drilled horizontally through the reservoir 102, with a production well 108 underlying each injection well 106. Generally, the injection wells 106 and production wells 108 will be drilled from the same pad 110 at the surface 112. This may make it easier for the production well 108 to track the injection well 106. However, in some embodiments the wells 106 and 108 may be drilled from different pads 110, for example, if the production well 108 is an infill well.

The injection of steam 104 into the injection wells 106 may result in the mobilization of hydrocarbons 114. These hydrocarbons may drain to the production wells 108 and be removed to the surface 112 in a mixed stream 116 that can contain hydrocarbons, condensate and other materials, such as water, gases, and the like. Sand filters may be used in the production wells 108 to decrease sand entrainment.

The mixed stream 116 from a number of production wells 108 may be combined and sent to a processing facility 118. At the processing facility 118, the water and hydrocarbons 120 can be separated, and the hydrocarbons 120 sent on for further refining. Water from the separation may be recycled to a steam generation unit within the facility 118, with or without further treatment, and used to generate the steam 104 used for the SAGD process 100.

The production wells 108 may have a segment that is relatively flat, which, in some developments, may have a slight upward slope from the heel 122, at which the pipe branches to the surface, to the toe 124, at which the pipe ends. When present, an upward slope of this horizontal segment may result in the toe 124 being around one to five meters higher than the heel 122, depending on the length of the horizontal segment. The slight slope can assist in draining fluids that enter the horizontal segment to the heel 122 for removal.

Solvent Assisted-SAGD (SA-SAGD) is an enhancement of the SAGD process in which a small amount of a hydrocarbon solvent (often referred to as a "diluent") is added to the steam injected into the reservoir. The solvent condenses on the steam/heavy oil interface and mixes with the heavy oil. The solvent further enhances the viscosity reduction process of the heavy oil and increases its drainage rate.

The inventors named herein have found that the performance enhancement of the exemplary SA-SAGD process, as well as other steam-utilizing heavy oil recovery processes, may depend on the operating pressure of the steam and the boiling range of the hydrocarbon solvent mixture injected with the steam.

As previously noted, the current techniques include the use of a tailored hydrocarbon solvent in steam-utilizing heavy oil recovery processes. The tailored solvent may be produced from a precursor mixture of hydrocarbons by removing light end hydrocarbon compounds therefrom. The residual hydrocarbon mixture produced in this way is referred to herein as a "tailored solvent" since its composition has been modified and selected to suit the heavy oil recovery process in which it is used. The use of such tailored solvents may have the advantageous effect of limiting the build-up in the reservoir of light end (low carbon number and low boiling) hydrocarbon compounds otherwise present in the precursor hydrocarbon mixtures, which build-up can impede the rates of heavy oil recovery, especially at low reservoir pressures (e.g. 100-500 kPa). It has further been found by the inventors that the presence of light end hydrocarbon compounds in solvent-steam mixtures may cause vapor dew point temperature depression that results in lower average condensation temperatures at vapor/heavy oil interfaces than steam injected alone, and consequently lower heavy oil uplift performance.

The precursor mixtures of hydrocarbons used for producing the tailored solvents may be obtained, for example, from petroleum and natural gas products by distillation and generally contain hydrocarbon compounds of at least C3 to C12 in various amounts, but may have additional compounds from the range of C1 to C30+, although not all of the C1 to C30+ hydrocarbon compounds may be present in all such mixtures. For example, being relatively volatile at normal temperatures and pressures, the C1 and C2 hydrocarbons may not always be present. Moreover, in some cases, the heavier hydrocarbons may be absent or present in only small amounts. However, the C3 to C15 compounds, and more especially the C3 to C12 compounds as noted, are often all present in significant amounts.

Hydrocarbon mixtures of this kind are available, for example, from petroleum and natural gas products, for example they may be obtained from natural gas distillation (e.g. as gas plant condensates) or as petroleum associate gases, or as crude refinery distillates (e.g. raw naphtha fraction) from an refinery crude distillation units, catalytic reforming units, catalytic cracking units, thermal cracking units, steam cracking units, hydrocracking units, cokers, or from petrochemical plants, e.g. from olefin units, aromatic solvent units, etc.

The nature of the light end hydrocarbons removed (i.e. number of carbon atoms they contain) may vary according to the conditions (e.g. temperature and/or pressure) employed for the steam injection in the recovery process. Generally, compounds having three carbon atoms (C3) and fewer are removed. More commonly, compounds having four carbon atoms (C4) and fewer are removed leaving a mixture of hydrocarbons having five carbon atoms or more (C5+) in the solvent. However, hydrocarbons having five carbon atoms (C5) and fewer, or even six carbon atoms (C6) and fewer, may be removed for particular applications. Particular tailored solvents resulting from such removal of light end compounds may contain compounds having seven to thirteen carbon atoms, or at least seven to twelve carbon atoms. Such tailored solvents may also contain amounts of at least some additional hydrocarbon compounds having thirteen to thirty or more, or fourteen to thirty or more, carbon atoms.

It has been found that the removal of the light end compounds from a precursor hydrocarbon mixture may provide a tailored solvent having a boiling range that causes substantially no, or relatively little, temperature depression (i.e. dew point depression) at the steam/heavy oil interface within the reservoir at the extraction operating pressures, compared to steam used without a solvent mixed therein. It is desirable to maintain a relatively high condensation temperature at the interface to achieve maximal heat-related viscosity reduction of the heavy oil. The amount of temperature depression may in some cases be 80° C. or less, 65° C. or less, 50° C. or less, or 40° C. or less, or 25° C. or less, depending on other variables, such as reservoir pressure. The use of such tailored solvents enables the steam/solvent mixture to maintain a high temperature at the interface, and thereby to reduce the viscosity of the heavy oil in the formation to an acceptably similar extent to steam used alone. However, the presence of the tailored solvent has an additional effect in reducing the viscosity of the heavy oil since it dissolves in the heavy oil at the pressures employed and thus acts as a diluent or thinner. This may enable higher rates of heavy oil recovery to be accomplished.

Generally, the selection of the light end compounds removed depends to some extent on the intended operational pressure of the recovery method. For example, when the operating pressure is in a range of 100-500 kPa, it may be advisable to remove hydrocarbon compounds having six carbon atoms and fewer, so that the tailored solvent thereby contains only heptanes and heavier hydrocarbon compounds. For operating pressures in a range of 500-1000 kPa, it may be advisable to remove hydrocarbon compounds having five carbon atoms and fewer, the solvent thereby containing only hexanes and heavier hydrocarbon compounds. For operating pressures in the range of 1000-2000 kPa, compounds having four carbon atoms and fewer may be removed, so that the solvent contains only pentanes and heavier hydrocarbon compounds. For operating pressures higher than 2000 kPa, it may be desirable to remove just compounds having three carbon atoms and fewer, so that the solvent thereby contains only butanes and heavier hydrocarbon compounds. Some heavy oil recovery processes, particularly CSS, may employ much higher pressures, e.g. in a range of 0.1 to 15 MPa, but in general at least those hydrocarbon compounds having three carbon atoms or less are removed from the solvent.

The original precursor hydrocarbon mixtures from which the tailored solvents are produced may be a mixture of hydrocarbons obtained on site adjacent to recovery wells (e.g. in the vicinity of an injection well used for a steam-utilizing heavy oil recovery process) or elsewhere (e.g. remotely from such an injection well) from a variety of sources as already indicated. Such precursors tend to be relatively inexpensive and may be readily available at or close to heavy oil recovery sites. In general, the precursor may include hydrocarbons from a range of C1 to C30+, and generally includes at least C3 to C12 or C3 to C15. Of course, the relative amounts of the individual hydrocarbons in the original (precursor) mixture will vary from source to source, and it may be desirable to select a source of precursor mixture that has a relatively high concentration of at least some of the compounds in the range of C6 to C13, or C7 to C12, since these compounds may have good solubility in the heavy oil at pressures employed while minimizing temperature depression of the dew point of the steam/solvent mixture. For example, a precursor from a crude oil refinery may be marginally superior to a precursor from a natural gas distillation plant for some applications because of a better distribution of hydrocarbon components, e.g. more of desirable C7+ compounds. In general, compounds of C14+ present in the tailored solvent may be less effective because they may not fully vaporize to be transported with steam to the vapour-heavy oil interface, but are not harmful because they leave the injector well mainly as liquid and dissolve well in the heavy oil of the reservoir and are removed from the reservoir together with the heavy oil. By doing so, they tend to reduce the viscosity of the heavy oil in vicinity of the well and are thus desirable for this reason. There is therefore generally no need to remove such heavier compounds, particularly if they constitute a small fraction of the tailored solvent thus produced (e.g. the combined amount (mole fraction) of such compounds in the tailored solvent is less than the combined amount of all other hydrocarbon compounds in the tailored solvent, and may be less than half the combined amount of all other hydrocarbon compounds, and may be less than one quarter of the combined amount of all other hydrocarbon compounds, and may be less than one tenth of the combined amount of all other hydrocarbon compounds present in the tailored solvent).

Removal of the light end hydrocarbons from the precursor can be achieved by fractional separation to leave a tailored solvent suitable for mixing with the steam. For example, the separation may be achieved in a single stage flash unit wherein operating temperatures and pressures are used to control the separation. Alternatively, fractionation columns may be employed, wherein operating pressures, reboiler and condenser temperatures, and reflux ratios may be employed to control the separation and purification of the precursor mixture. While complete removal of the light end hydrocarbon compounds is desired, fractional separation techniques may not be perfectly successful and unavoidable amounts of the light end compounds may remain. In general, up to 10 mole % of the original amount of such compounds may remain in the tailored solvents without significant harm to the desired results. The production of the tailored solvents may be carried out continuously as a steam-utilizing heavy oil recovery process is operated.

Tailored solvents produced in this way from precursor mixtures may be regarded as "fresh" tailored solvents and may be used alone or in combination with recycled or recovered tailored solvents previously injected into and collected from a subterranean reservoir. For example, the produced gas from a production well, which may be the combination of casing gas from a production well and/or flashed gas from produced liquid, may contain steam and tailored solvent used earlier in the extraction process and the tailored solvent may be recovered for further use. However, in addition to the tailored solvent, the hydrocarbons in the recovered gas may contain a light fraction (e.g. methane) derived from the reservoir itself as well as other gases such as $CO_2$ from aqua-thermolysis of oil in the reservoir, and water, so the recovered gas thus obtained may first have to be treated to remove the light end hydrocarbons and contaminants to leave only the desired heavier hydrocarbons of the tailored solvent. Thus, the recovered gas may be considered a precursor mixture of hydrocarbons used for the production of a tailored solvent. The production of a tailored solvent from such a precursor mixture may also be achieved by fractional separation, which will also remove water and possibly other undesired components from the recovered gas. Although the tailored solvent may be recovered and re-used in this way, there will be inevitable losses or retention in reservoir, so it is usual to make up the lost fraction by adding "fresh" tailored solvent as mentioned above. It may be that the casing gas contains up to 60 vol. % of the original tailored solvent with the remainder being extracted with the heavy oil from the production well. The produced liquid hydrocarbon from tubing may contain 10 wt. % (about 15 vol. %) of the tailored solvent. This could be separated and recycled, but it is usually left with the heavy oil to reduce its viscosity so that it can be transferred by pipeline to treatment facilities (indeed additional diluent up to 25 vol. % may be added). However, if the heavy oil does not have to be pipelined and transported very far (e.g. if there is a refinery close to the heavy oil recovery site), tailored solvent may be recovered from the extracted heavy oil for recycling and reuse.

It may be pointed out that some heavy oil recovery processes may not employ a well casing producing a casing gas and instead may employ just a production wellbore through which all of the reservoir products are delivered. In such cases, the tailored solvent may be recovered by separation from the reservoir products thus delivered from the wellbore.

The removal of light end hydrocarbons from the precursors may be carried out directly at the heavy oil recovery site by providing pad level or field level apparatus. Alternatively, the treatment of hydrocarbon precursors may be carried out off-site in a suitable remote facility and brought into the field by pipeline or by other means, although this may be less economical. At the site, the removal operation of low end components from the precursor or casing gas may be continuous, thereby allowing producing, recovering, treating, making-up and reusing the tailored solvent for as long as the heavy oil recovery process is in operation.

The tailored solvents may be mixed with steam in the same proportions conventionally used for SA-SAGD and other steam-utilizing heavy oil recovery processes. For example, for SA-SAGD, the solvent content of the injected fluids is generally no more than 40% (by weight) and may be in the range of 5 to 50%, or 25 to 50%, or whatever is considered appropriate and effective for a particular process and a particular reservoir.

Figure 2:
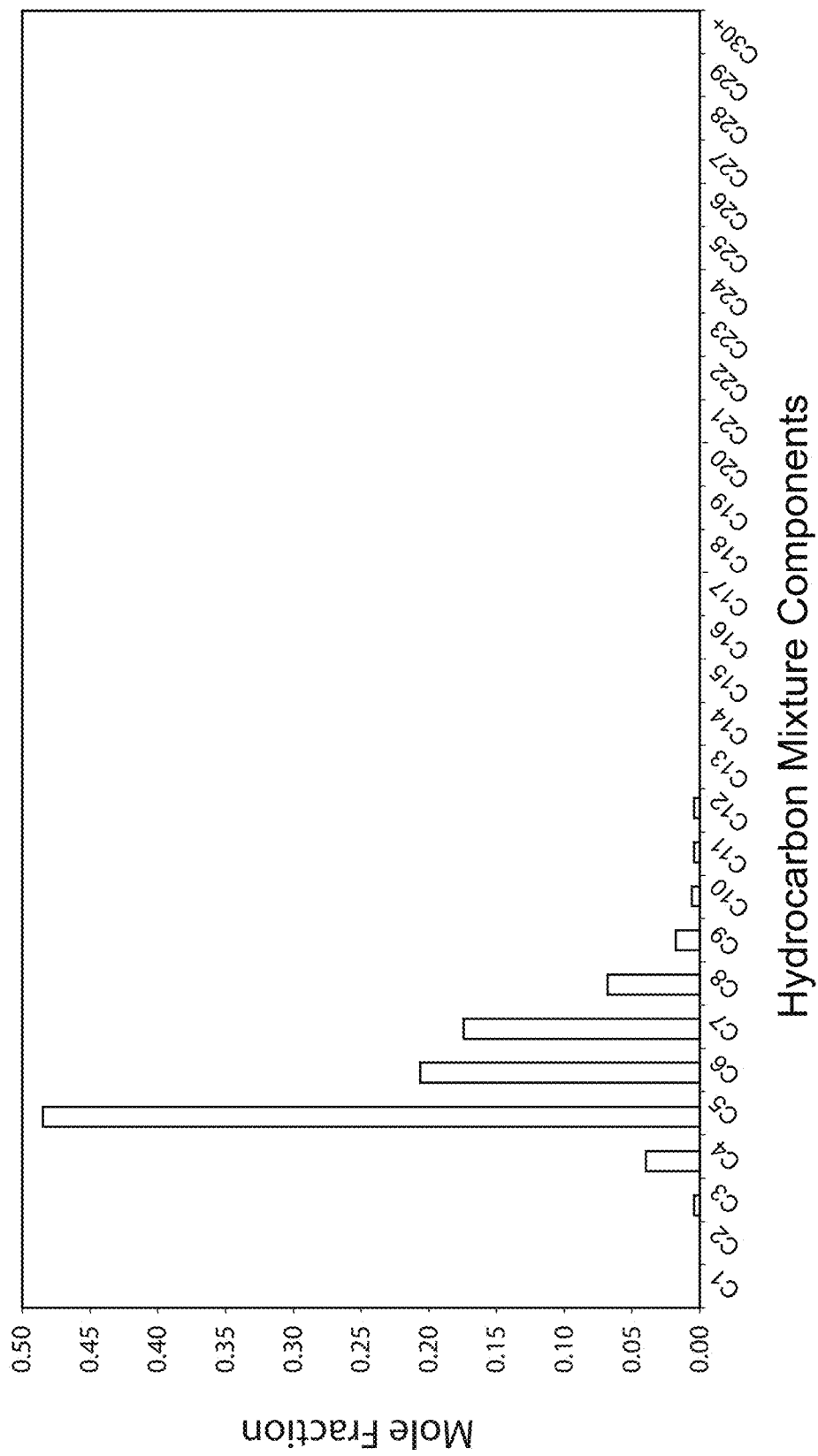
FIG. 2 is a graph showing the amounts of hydrocarbon component compounds in a precursor solvent derived from natural gas.

FIG. 2 shows the composition of an example of a hydrocarbon precursor mixture obtained from a natural gas plant from which a tailored solvent may be produced, e.g. by fractionation. The components forming the largest fractions are C5 to C8, but compounds of C9 to C12 are also present in small amounts. There are substantially no compounds of C13 and higher in this particular precursor mixture. Components of C3 and C4 are also present.

Figure 3:
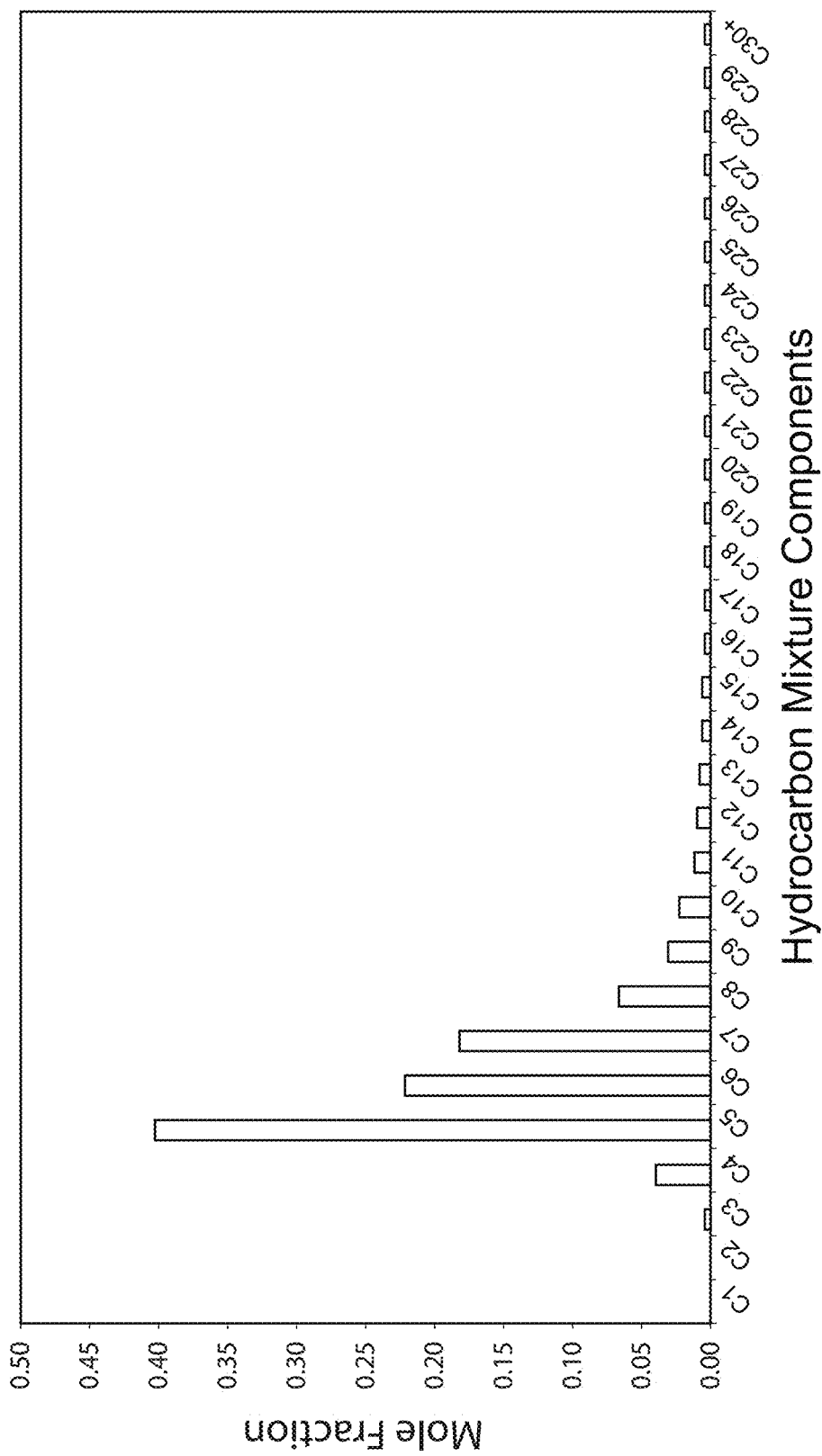
FIG. 3 is a graph similar to FIG. 2 but showing an alternative precursor solvent derived from distillation of crude oil.

FIG. 3 shows the composition of an example of a hydrocarbon precursor mixture obtained from a crude oil refinery plant. The content of C9 to C13 is higher than in the mixture of FIG. 2, and there is a long tail of compounds of C14 to C30+, albeit each in rather small amounts. Again, this mixture may be employed to form a tailored solvent, e.g. by fractionation. The mixture of FIG. 3 may in some instances form a more desirable precursor for the tailored solvent because it has a higher concentration of C7+ compounds that the inventors have found are good for heavy oil recovery.

Figure 4:
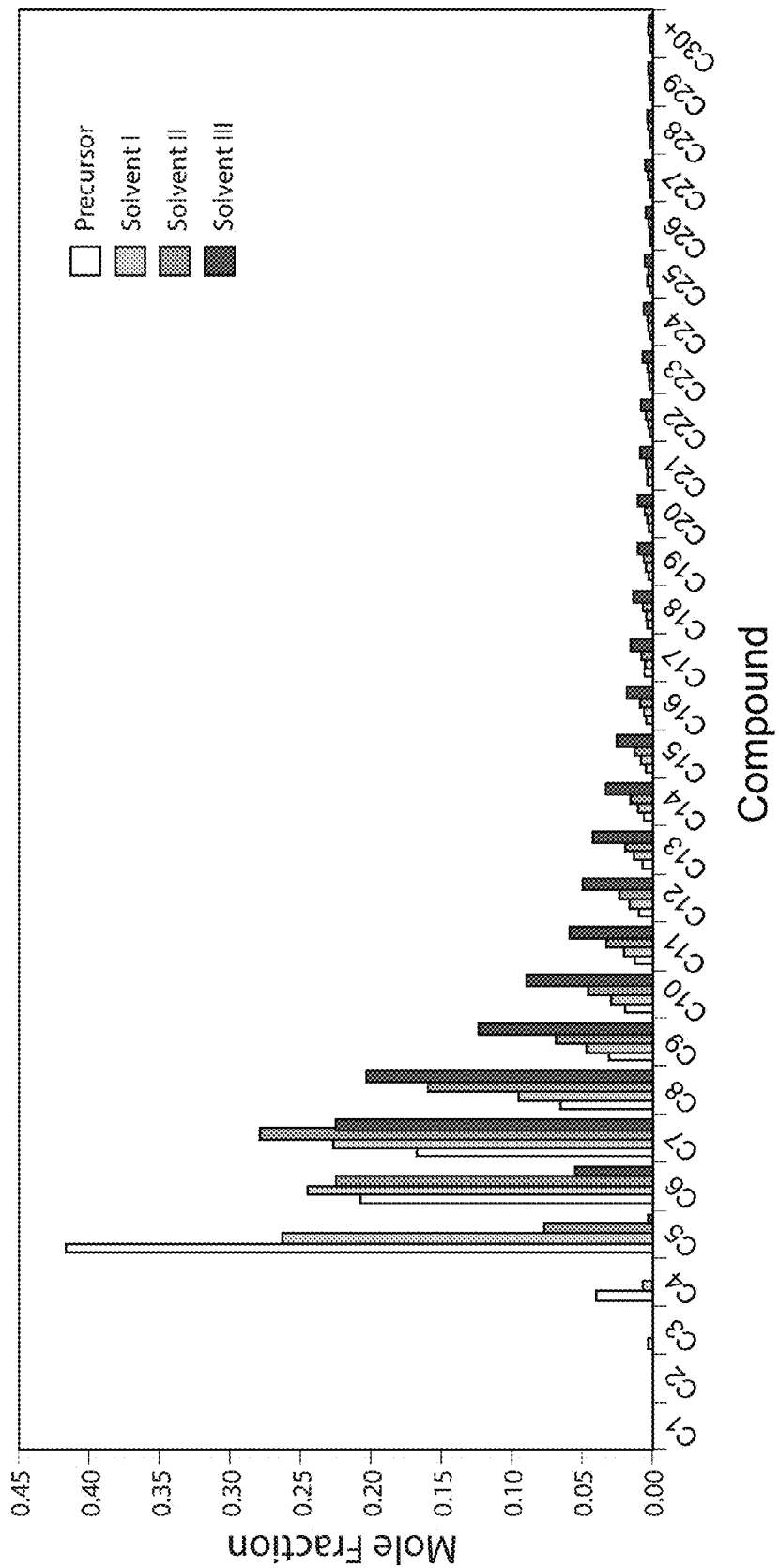
FIG. 4 is a graph similar to FIG. 3 but also showing the compositions of three examples of tailored solvents (referred to as Solvents I, II and III) produced from a precursor solvent by removing low end hydrocarbons therefrom.

FIG. 4 shows the compositions of three different tailored solvents (Solvents I, II and III) prepared by fractionation from precursor hydrocarbon mixtures, the composition of one of which is also shown on the graph (being the precursor mixture of FIG. 3). It will be noted in particular that the tailored Solvent III contains C6+ with only a very small amount of C5 and no C1 to C4.

Figure 5:
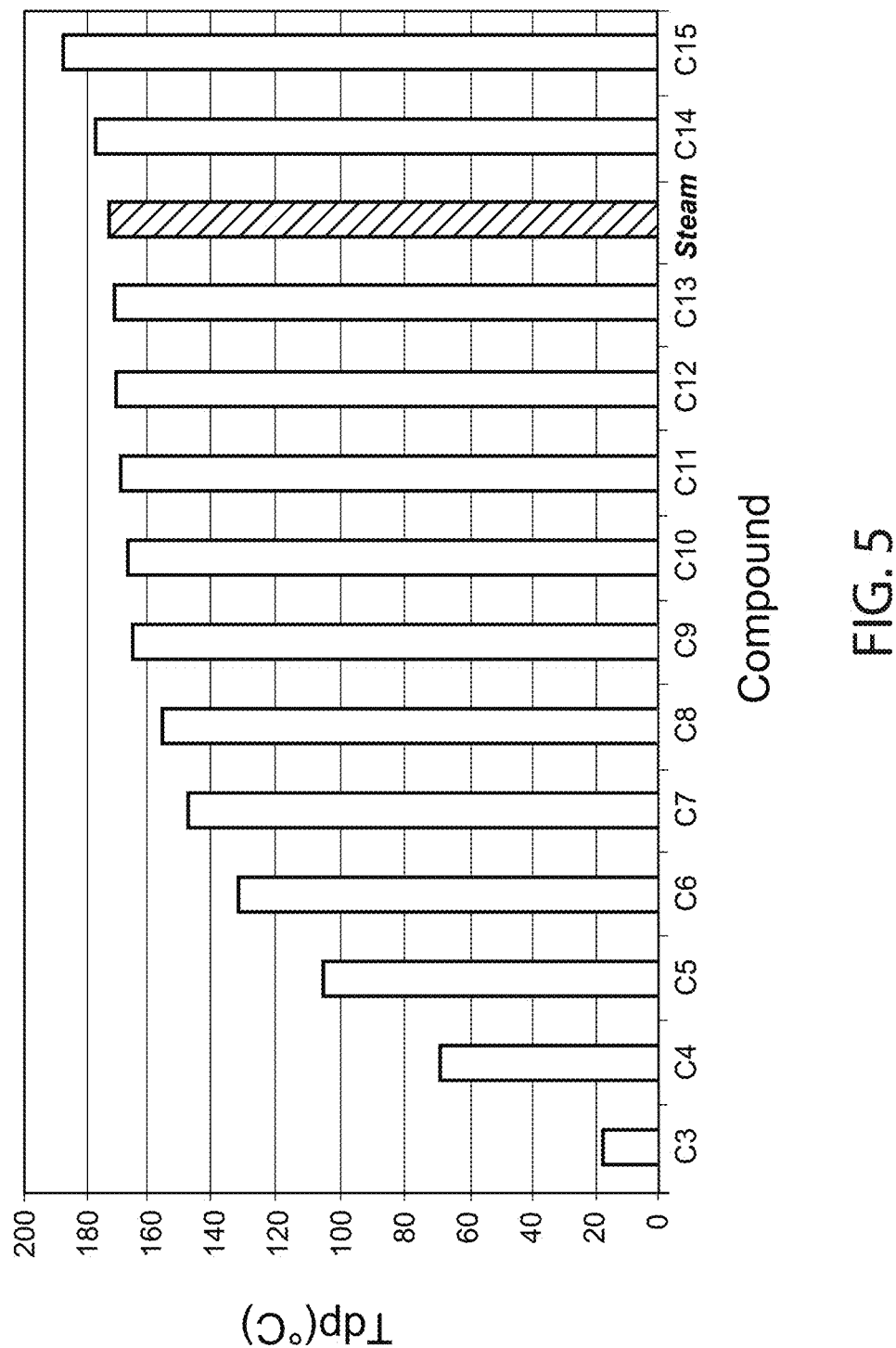
FIG. 5 is a graph showing the manner in which the hydrocarbon components of a hydrocarbons solvent affect the dew points of steam/solvent mixtures relative to steam itself.

FIG. 5 shows steam/solvent minimum condensation (dew point) temperatures (minimum-boiling azeotropes) at a pressure of 0.8 MPa for different individual hydrocarbon compounds (C3 to C15) present in typical solvent mixtures mixed with steam, and also the dew point of steam itself. The dew point temperatures for all such azeotropes and steam itself tend to be raised or lowered as the pressure is raised or lowered. As can be seen from the figure, the light end components (C4 and lighter in the figure) of the solvent mixture will cause a considerable reduction in the dew point temperature of pure steam, resulting in an average lower vapor/heavy oil interface temperature in the recovery process. The medium weight hydrocarbons (e.g. C5 to C13 compounds) do not cause large reductions in the dew point temperatures compared to steam and may be considered as an effective or most effective portion of the solvent mixture for use in a steam-utilizing recovery process. Compounds forming the heavy end of the tailored solvent (C13+ compounds) have higher dew points than the saturation temperature of steam meaning that these compounds do not effectively or fully vaporize when mixed with saturated steam. Therefore, they may not travel efficiently to the vapor/heavy oil interface during SA-SAGD or other extraction processes, but may nevertheless dissolve in the heavy oils that they encounter. The amount of the heavy-end fraction in the solvent is generally quite small (as can be seen from FIGS. 2 and 3) and in practice these compounds do not need to be separated from the solvent as they are not harmful. They leave the injector well in a liquid state and mix with the bitumen being produced by the producer well. Thus, in general, it is necessary to remove only the light end faction from the precursor hydrocarbon compound mixture.

Figure 6:
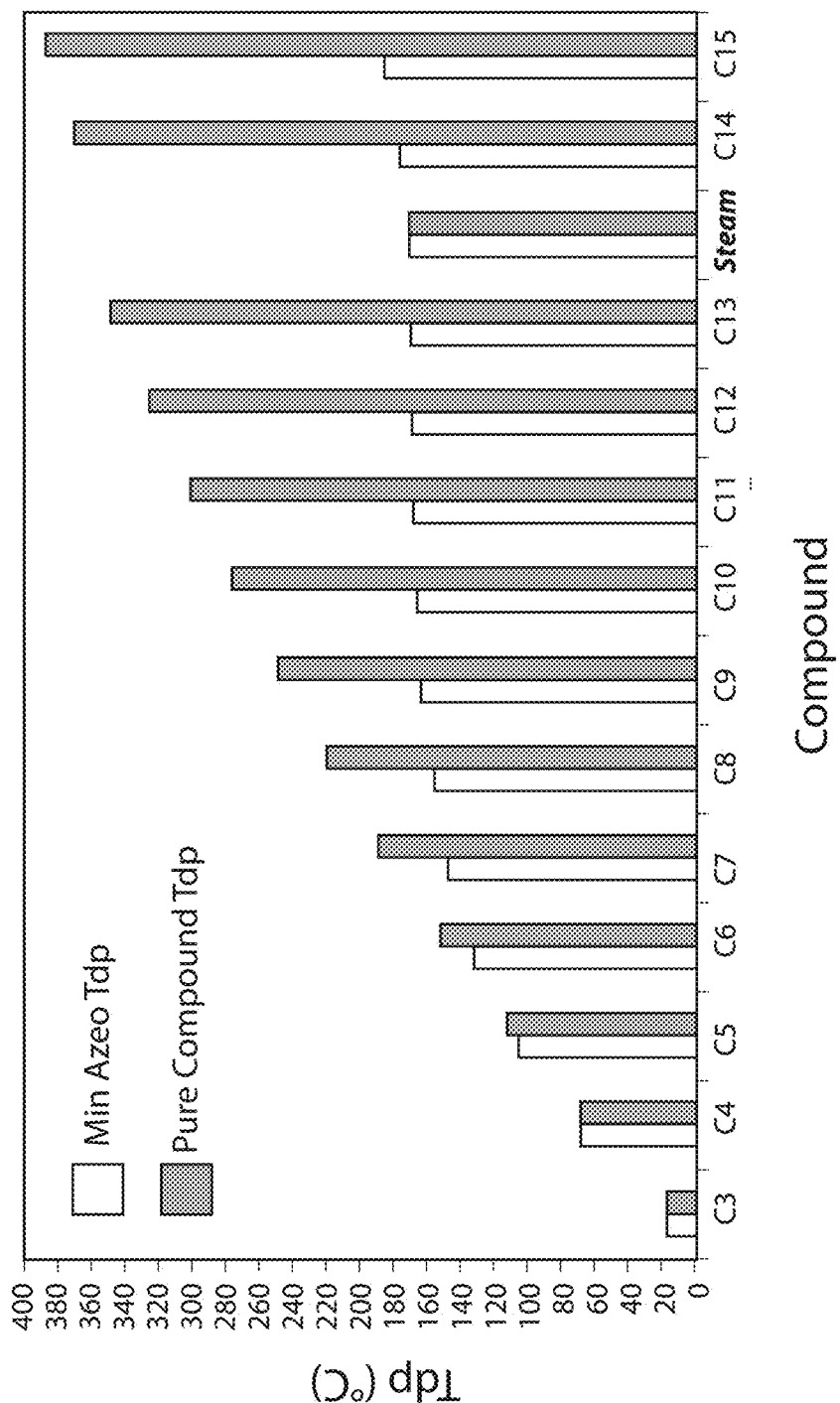
FIG. 6 is a graph showing dew point temperatures of steam and various hydrocarbon compounds, both in the pure form and in mixtures with steam.

FIG. 6 is a graph similar to that of FIG. 5 but comparing the vapor pressures of pure solvent hydrocarbon compounds with those of the vapor pressures of compound/steam azeotropes and the vapor pressure of steam itself. The figure shows that pure compounds having carbon numbers higher than C6 (i.e. C7+) have higher saturation temperature than steam itself suggesting from a simple thermodynamic approach that such components may not be suitable for use with steam. However, the saturation temperature of the azeotropes of such compounds with steam shows that components up to C13 may be suitable for use as solvents in heavy oil recovery processes since they will vaporize and travel with the steam to the interface. Consequently, better use can be made of the major components of available solvent sources (tailored solvent precursors) than may have been realized previously, and that while light end components are removed, there is no need for, nor benefit in, removing any of the higher end components.

Thus, the disclosure may involve the removal of just the light end compounds from a hydrocarbon solvent (tailored solvent precursor) prior to its use in SA-SAGD or other processes. This optimized solvent is thus a tailored solvent produced from an available hydrocarbon mixture from which the light end compounds have been separated. The solvent is tailored in such a way as to obtain a component boiling range that causes a relatively small dew point temperature depression in a reservoir and limits build-up of light end hydrocarbons in the reservoir. For maximum economy, the tailored solvent may be made from a combination of freshly produced tailored hydrocarbon mixture and solvent recovered from produced heavy oil from a SA-SAGD operation or other process.

The tailored solvent may be prepared from a precursor hydrocarbon mixture either on-site or close thereto, or in a remote facility. If the removal of the light end compounds from the precursor hydrocarbon mixture is carried out near to production wells, the light end compounds may then be used as viscosity-reducing diluents mixed with extracted heavy oils for facilitating transportation by pipeline.

Figure 7:
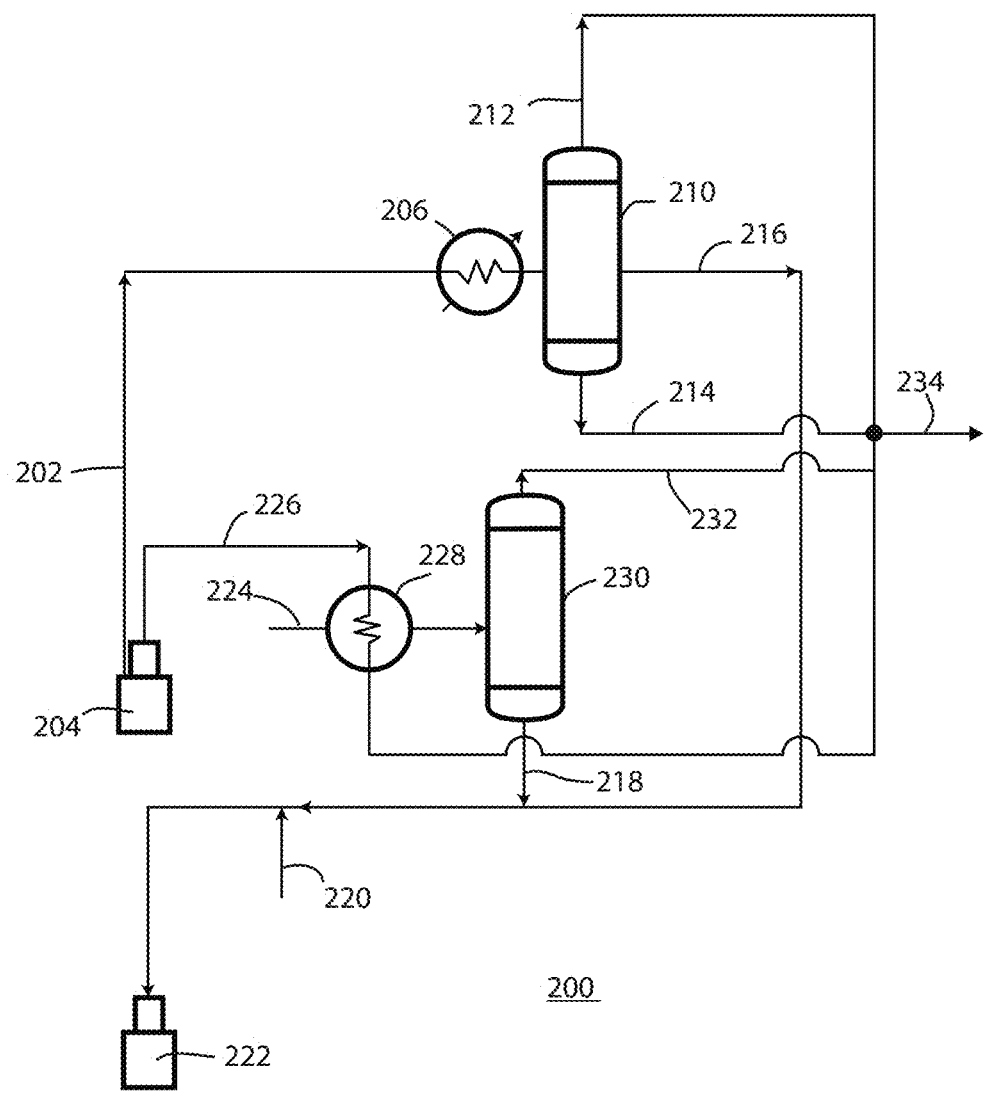
FIG. 7 is a diagram of a pad level tailored solvent recovery apparatus.
Figure 8:
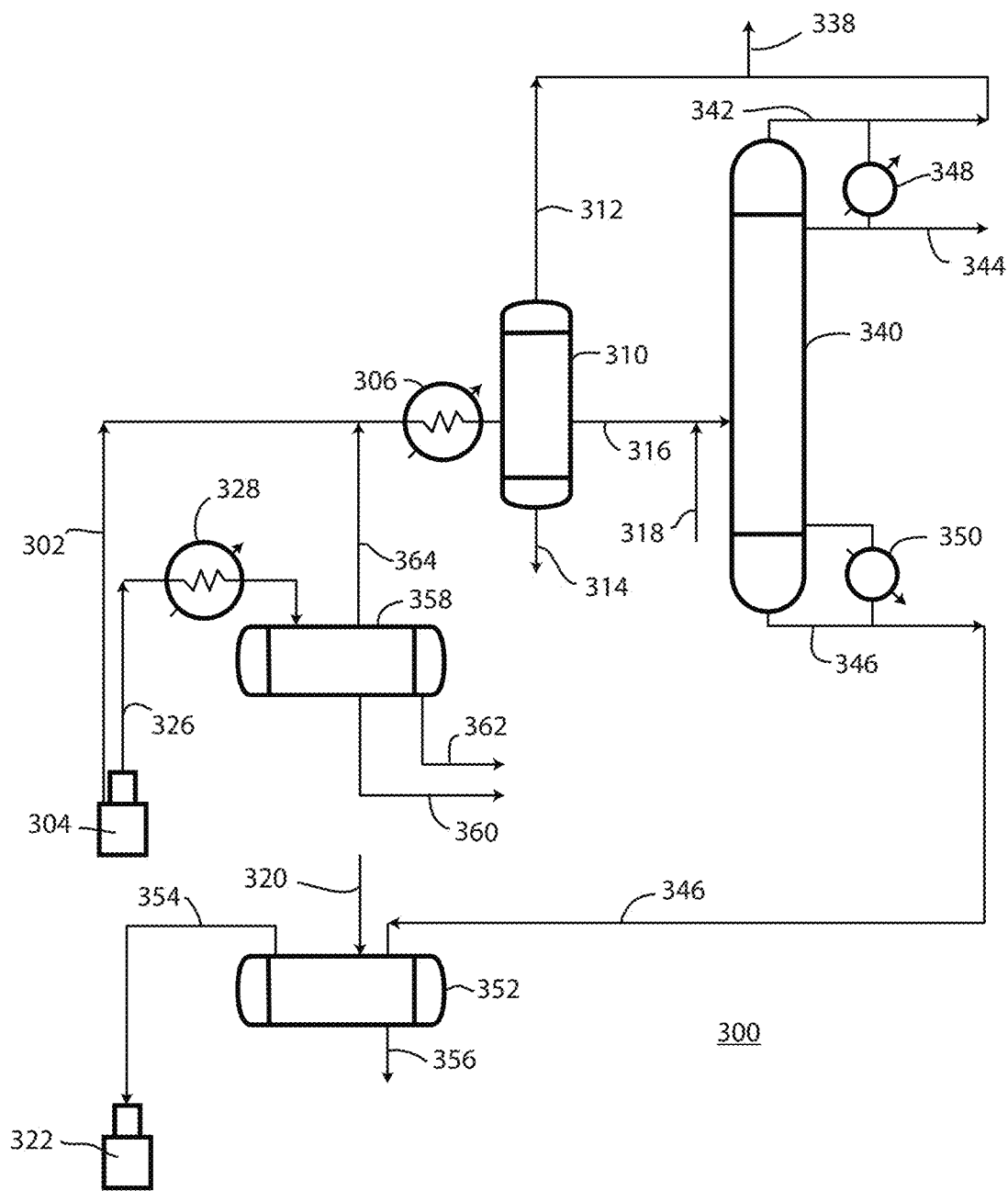
FIG. 8 is a diagram of a field level tailored solvent recovery apparatus.
Figure 9:
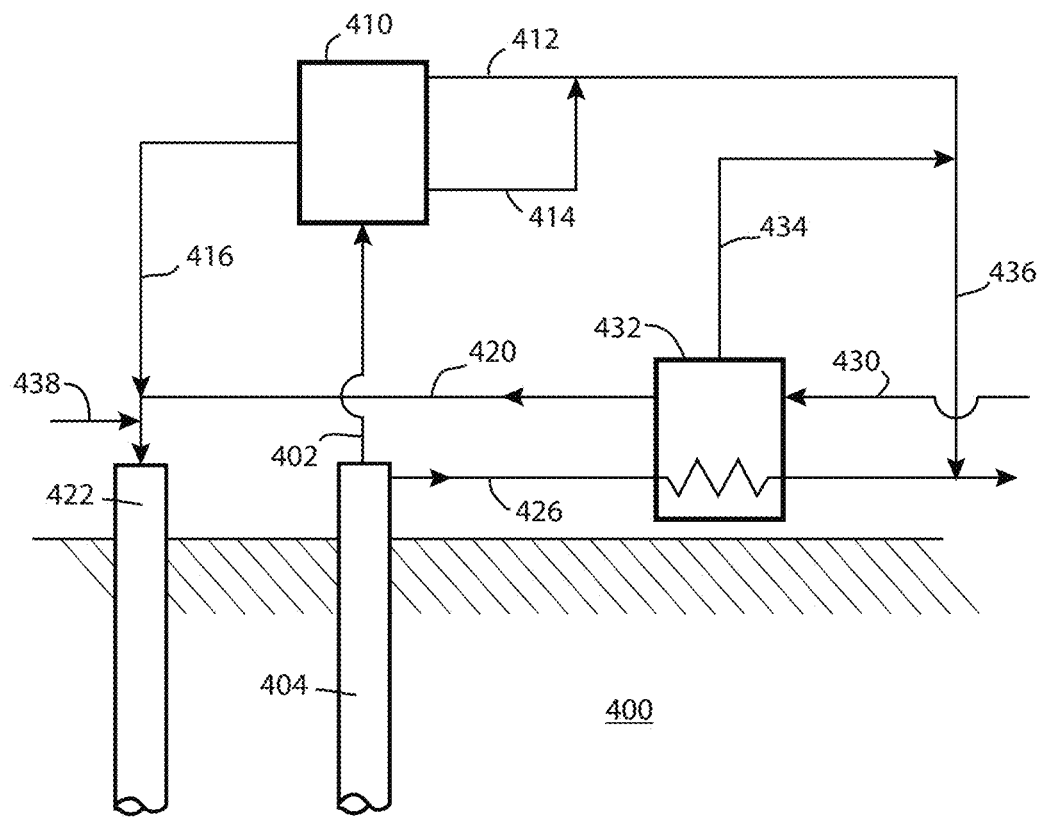
FIG. 9 is embodiment diagram of a pad level tailored solvent recovery apparatus.
Figure 10:
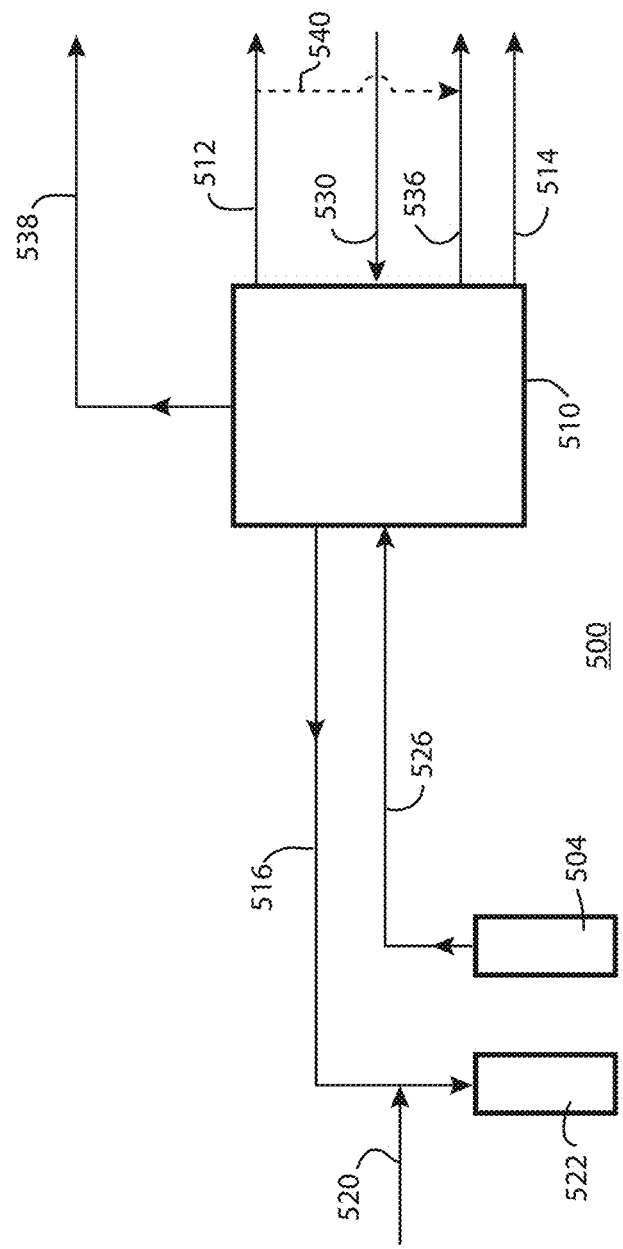
FIG. 10 shows an example of a general form of an oil/solvent separation facility.

FIGS. 7 to 10 show methods of, and apparatus for, at least partially recovering tailored solvent from a subterranean reservoir into which the tailored solvent was previously injected. In these figures, in general, a gas is collected from a production well used for recovery of heavy oils from a subterranean reservoir by a steam-utilizing heavy oil recovery process employing a hydrocarbon solvent, the gas is further separated into fractions including water, light gas containing light end hydrocarbons, and a mixture of hydrocarbon compounds from which the light end hydrocarbons have been removed. The hydrocarbon compounds from which the light end hydrocarbons have been removed are then used as a tailored solvent for further oil recovery using the steam-utlizing heavy oil recovery process. FIG. 7 shows a pad level solvent recovery and tailoring unit 200 in which the solvent light-end components are separated in single stage separation vessels at the well site satellite facility. FIG. 8 shows a solvent recovery and tailoring unit 300 using fractionation column that can be a part of a field main processing facility. FIG. 9 shows a pad level solvent recovery apparatus 400 in which heat from the recovered heavy oil is used to drive off the light end of the solvent recovered from the production well. FIG. 10 shows a general separation facility 500 which may be employed for heavy oil recovery operations that do not make use of a wellbore casing and therefore produce no casing gas.

In the case of FIG. 7, casing gas 202 from a production well 204 is fed to a casing gas cooler 206 to cause initial gas cooling and from there to a gas separator 210. The casing gas comprises water vapor or steam and a mixture of hydrocarbons. In the separator 210, the casing gas is separated into a light gas 212, water 214 and a recovered tailored solvent 216 that contains hydrocarbons of C5+(i.e. a mixture of hydrocarbons having at least 5 carbon atoms). This separation is achieved by procedures well known in the oil and gas industry by adjusting temperatures and collecting condensates at appropriate heights within the separator. Necessary adjustments may be made to ensure that hydrocarbons of C4 or lower exit within the light gas component 212 but hydrocarbons of C5 or higher exit within the recovered solvent 216.

The recovered solvent 216 may be mixed with make-up tailored solvent 218 (described below). The recovered solvent 216 may be mixed with steam 220 from a conventional steam supply (not shown) to form a vaporized mixture. The vaporized mixture may be delivered to an injection well 222 for the extraction procedures as shown, for example, in FIG. 1, which may involve establishing fluid communication in a heavy oil bearing formation of a subterranean reservoir between the injection well and a production well, injecting the vaporized mixture into the subterranean reservoir via the injection well to permit the vaporized mixture to condense within the subterranean reservoir to release latent heat of condensation and extracting heavy oil from the production well 204.

The make-up tailored solvent 218 compensates for inevitable losses in the system. It is produced from a mixture of hydrocarbons 224 that may be produced, for example, by distillation of natural gas condensate or petroleum products and which may have for example the constituent profile of FIG. 2 or FIG. 3. The mixture is heated by heat exchange with production oil 226 from production well 204 in a heat exchanger 228. The mixture is then fed to a light end separator 230 where it is separated into make-up tailored solvent 218 (containing hydrocarbons having at least 5 carbon atoms) and a light end component 232. The light end component 232 from separator 230 may be combined with the light gas component 212 and water 214 from separator 210 and these components are in turn combined with the production oil 226 from the production well to lower the viscosity of the production oil in a combined outlet 234.

In FIG. 7, the tailored solvent from which the light end has been separated may be continuously recycled through the injection and production wells with losses being made up by supplies of fresh tailored solvent from which the light end has also been separated.

FIG. 8 is a diagram of a field level solvent recovery unit 300. In this arrangement, casing gas 302 from a production well 304 may be passed through a gas cooler 306 and delivered to a gas separator 310 that separates the gas into a light gas 312, water 314 and recovered tailored solvent 316. Make-up (fresh) tailored solvent 318 or precursor hydrocarbon mixture may be added to the recovered tailored solvent stream 316. The mixture may be delivered to a solvent fractionator 340 that separates the solvent into a light gas fraction 342, a light end fraction 344 used for diluent-heavy oil blending, and a heavy end fraction 346. Heat exchangers 348 and 350 may be employed for control of the streams. Off-gas may be vented at 338. Off-gas may be used as fuel gas after going through necessary treatments such as dewatering and sweetening. The heavy end fraction 346 comprises a mixture of hydrocarbons having five carbon atoms or more, but substantially no hydrocarbons of four carbon atoms or fewer. The heavy end fraction may be fed to a steam drum 352 where it is mixed with steam 320. The resulting steam/solvent mixture 354 may be delivered to an injection well 322 for SA-SAGD. Condensate 356 (a mixture of water and heavy hydrocarbons) is removed from drum 352. In this configuration, the non-vaporizing portion of the tailored solvent are further separated from steam-solvent mixture before injection into well. In a different configuration, tailored solvent 346 and steam 320 may be mixed and injected directly into well 322 without passing through separator 352 for non-vaporizing compounds removal. Additionally, product 326 from production well 304, which is in the form of an oil and water emulsion, is passed through a cooler 328 and delivered to an emulsion separator 358 separated into water 360, a blend of bitumen and diluents 362, and a hydrocarbon solvent component which is delivered to the casing gas stream 302 via conduit 364 and thereby delivered to the gas separator 310 as an additional precursor mixture of hydrocarbon compounds along with the casing gas itself.

In FIG. 9, the apparatus 400 may be located at the pad level immediately adjacent production and injection wells 404 and 422, respectively. Casing gas 402 may be fed to a gas cooler/separator 410 where it may be separated into a light end gas 412, a tailored solvent 416 and water 414. The water 414 may be recombined with the light end gas 412 for removal from the site. The tailored solvent 416 may be returned to the injection well 422 for injection into the underground formation mixed with steam added at 438. Make-up tailored solvent 420 may be added to the recovered tailored solvent 416 from the cooler/separator 410 before the injection into the injection well. This make-up solvent 420 may be obtained by passing a solvent precursor mixture 430 through a heat-exchanger/separator 432 that transfers heat from heavy oil 426 recovered from the production well 404. The heat transferred in this way allows light end components 434 to be boiled off and added to the light end fraction 412 and water 414 from the cooler/separator 410. The combined feed 436 of light end components and water may be mixed with the heavy oil 426 emerging from the heat-exchanger/separator 432 and may be removed from the site. Thus, the heat from the hydrocarbons recovered from the heated underground reservoir may be used to drive off the light end components from a fresh supply of hydrocarbon precursor mixture and the resulting tailored solvent may be used to make up for losses of the tailored solvent recovered and recycled from the reservoir. One or both of the tailored streams 416 and 420 obtained in this way may be optimized in terms of composition to the characteristics of the reservoir. For example, under-saturated reservoirs may have a higher tolerance for light end fractions as such reservoirs may have a greater capacity to absorb these fractions.

FIG. 10 shows a general form of separation facility 500. Such a facility may be used with production wells that do not operate with a down-hole pump and rely on reservoir pressure to lift the heavy oil. Wells of this kind generally do not have a casing surrounding the well bore so that all of the produced fluids (heavy oil, gases, light components and water) emerge from the well bore itself. The production well is shown at 504 from which the production fluid, which may contain used tailored solvent, may be conveyed through pipe 526 to a gas separator 510. In the gas separator 510, the production fluid 526 may be separated into heavy oil 536, water 514 and gas 538. The gas 538 may be used as a fuel gas. The heavy oil 536 may contain a small proportion of unrecovered tailored solvent that may reduce its viscosity. The water 512 may be recycled. Some of the used tailored solvent in the production fluid may be separated into light ends 512 and recovered tailored solvent 516. A solvent precursor 530 may be introduced into the gas separator 510. Light ends may be removed combined with the light ends 512 from the production fluid, leaving a tailored solvent that is combined with the recovered tailored solvent 516 from the production fluid. The light ends 512 may be added to the heavy oil 536 to further reduce its viscosity to facilitate pipelining, as indicated by dashed line 540 or it may be used as a fuel. The gas separator 510 operates as a tailored solvent recovery and regeneration apparatus as well as a generator of fresh make-up tailored solvent from the solvent precursor 530. The tailored solvent 516 recovered and produced in this way may be mixed with steam 520 and injected into an injection well 522.

It will be appreciated that FIGS. 7 to 10 may be modified if required to produce a tailored solvent from which a larger range of light end components have been removed, e.g. C4 and below, C5 and below, C6 and below, etc. Hence the tailored solvent may be optimized for the recovery conditions employed at a particular location, e.g. the pressure and/or temperature of the recovery process.

Various tests and experiments have been carried out by the inventors named herein to establish the principles underlying the techniques described herein. The results relevant to the disclosure are described below.

Figure 11:
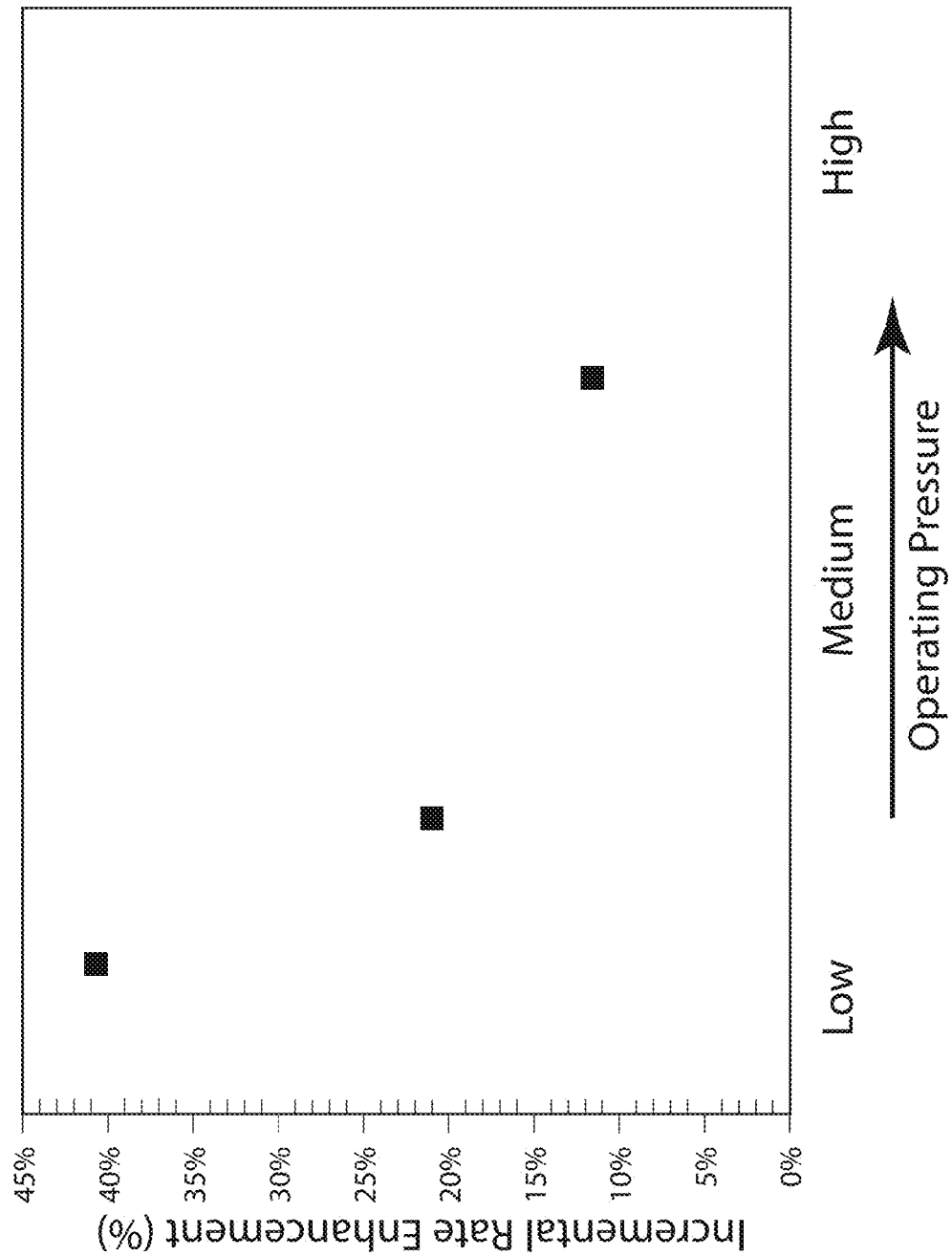
FIG. 11 is a graph showing the enhancement obtained by used a tailored solvent compared to an untailored solvent on production results from an SA-SAGD process.

Tests were carried out of an SA-SAGD process using an untailored solvent mixture (precursor solvent) containing low end hydrocarbons mixed with steam compared to a tailored solvent/steam at various operating pressures (low, medium and high). FIG. 11 shows the incremental rate enhancement effect of using the tailored solvent compared to the untailored solvent. The results show that a rate enhancement was obtained over the range of pressures. Therefore SA-SAGD performance may be optimized by using a tailored solvent at various operating pressures.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method of recovering heavy oil from a subterranean reservoir, the method comprising:
    carrying out a steam-utilizing heavy oil recovery process to recover heavy oil from the subterranean reservoir while employing a steam/solvent mixture for said steam-utilizing heavy oil recovery process instead of steam alone,
    wherein solvent used in said steam/solvent mixture is a tailored solvent obtained from a precursor mixture of hydrocarbon compounds by removing light end hydrocarbon compounds from said precursor mixture.

2. The method of claim 1, wherein said solvent is substantially free of hydrocarbon compounds having one of (i) three carbon atoms and fewer, (ii) four carbon atoms and fewer, (iii) five carbon atoms and fewer and (iv) six carbon atoms and fewer.

3. The method of claim 1, wherein said solvent contains amounts of hydrocarbon compounds having one of (i) seven to thirteen carbon atoms, (ii) seven to twelve carbon atoms and (iii) fourteen to thirty or more carbon atoms.

4. The method of claim 1, wherein a combined mole fraction of one of (i) said at least some compounds having fourteen to thirty carbon or more atoms in said solvent is less than a combined mole fraction of all other hydrocarbon atoms present in said solvent, (ii) said at least some compounds having fourteen to thirty carbon or more atoms in said solvent is less than half a combined mole fraction of all other hydrocarbon atoms present in said solvent and (iii) said at least some compounds having fourteen to thirty carbon or more atoms in said solvent is less than a quarter of a combined mole fraction of all other hydrocarbon atoms present in said solvent and (iv) said at least some compounds having fourteen to thirty carbon or more atoms in said solvent is less than one tenth of a combined mole fraction of all other hydrocarbon atoms present in said solvent.

5. The method claim 1, wherein said steam-utilizing heavy oil recovery process is operated at a reservoir operating pressures in a range of 0.1 to 15 MPa.

6. The method of claim 1, wherein one of
    (i) said steam-utilizing heavy oil recovery process is operated at a reservoir operating pressures in a range of 100-500 kPa, and wherein said tailored solvent is substantially free of hydrocarbon compounds having six carbon atoms and fewer,
    (ii) said steam-utilizing heavy oil recovery process is operated at a reservoir operating pressures in a range of 500-1000 kPa, and wherein said tailored solvent is substantially free of hydrocarbon compounds having five carbon atoms and fewer,
    (iii) said steam-utilizing heavy oil recovery process is operated at a reservoir operating pressures in a range of 1000-2000 kPa, and wherein said tailored solvent is substantially free of hydrocarbon compounds having four carbon atoms and fewer and
    (iv) said steam-utilizing heavy oil recovery process is operated at a reservoir operating pressures higher than 2000 kPa, and wherein said tailored solvent is substantially free of hydrocarbon compounds having three carbon atoms and fewer.

7. The method of claim 1, wherein said precursor mixture prior to removal of said light end hydrocarbon compounds is obtained by distillation of one of petroleum products and natural gas products.

8. The method of claim 1, wherein said precursor mixture prior to removal of said light end hydrocarbon compounds comprises a hydrocarbon mixture recovered from said subterranean reservoir into which steam containing a tailored solvent was previously introduced.

9. The method of claim 1, further comprising removing said light end hydrocarbon compounds from said precursor mixture to produce said tailored solvent.

10. The method of claim 9, wherein removing said light end hydrocarbon compounds is carried out one of (i) in a vicinity of an injection well used for said steam utilizing heavy oil recovery process and (ii) remotely from an injection well used for said steam utilizing heavy oil recovery process.

11. The method of claim 9, wherein removing said light end compounds comprises continuously removing said light end compounds while operating said steam utilizing heavy oil recovery process.

12. The method of claim 1, wherein said steam-utilizing heavy oil recovery process is a process selected from the group consisting of solvent assisted-steam assisted gravity drainage, cyclic steam stimulation and steam flooding.

13. A method of recovering heavy oil from a subterranean reservoir by a solvent assisted, steam assisted gravity drainage process, comprising:
   a) establishing fluid communication in a heavy oil-bearing formation between an injection well and a production well;
   b) vaporizing water and a tailored hydrocarbon solvent to produce a vaporized mixture;
   c) injecting said vaporized mixture into the subterranean reservoir via the injection well to permit the vaporized mixture to condense within the subterranean reservoir and to release latent heat of condensation to the subterranean reservoir; and
   d) extracting heavy oil from the production well; wherein said tailored hydrocarbon solvent is a mixture of hydrocarbon compounds obtained from a precursor mixture of hydrocarbon compounds by removing light end hydrocarbon compounds from said precursor mixture.

* * * * *